United States Patent

Omietanski

[15] 3,694,480
[45] Sept. 26, 1972

[54] NOVEL ORGANOFUNCTIONAL SILICON COMPOUNDS SUBSTITUTED WITH HALOGEN AND PROCESSES FOR MAKING SAME

[72] Inventor: George M. Omietanski, Marietta, Ohio

[73] Assignee: Union Carbide Corporation

[22] Filed: June 11, 1968

[21] Appl. No.: 735,986

[52] U.S. Cl. ........260/448.2 B, 106/13, 117/126 GQ, 117/126 GS, 127/30, 252/49.6, 252/78, 252/351, 252/DIG. 1, 260/46.5 E, 260/46.5 G, 260/46.5 Y, 260/209 R, 260/210 R, 260/293 D, 260/293 R, 260/398, 260/404, 260/405.5, 260/408, 260/410.6, 260/448.2 E, 260/448.2 N, 260/448.2 R, 260/448.8 R

[51] Int. Cl............C07f 7/08, C07f 7/10, C07f 7/18

[58] Field of Search .....260/448.2 B, 448.2, 448.2 N, 260/448.8 R, 398, 408, 46.5 Y, 448.2 E

[56] References Cited

UNITED STATES PATENTS 3,132,117  5/1964  Schmidt..............260/448.2 X

FOREIGN PATENTS OR APPLICATIONS 713,075  7/1965  Canada.....................260/348

Primary Examiner—Tobias E. Levow
Assistant Examiner—P. F. Shaver
Attorney—Paul A. Rose, Aldo John Cozzi, Eugene C. Trautlein, George A. Skoler and Reynold J. Finnegan

[57] ABSTRACT

Novel organofunctional silicon compounds including silanes of the formula

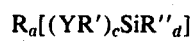

and siloxane polymers and copolymers containing the unit of the formula

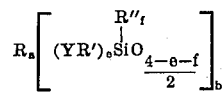

wherein R, R' and R" are organic groups, Y is divalent oxygen, divalent sulfur, or divalent nitrogen groups, i.e.,

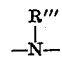

where R''' is H or a hydrocarbon radical, and R' has carbon-bonded halogen attached to the carbon atom adjacent the carbon atom to which said Y group is attached. These compounds are made by the reaction of an olefinically unsaturated silane or siloxane with an active hydrogen atom containing organic compound and a positive halogen compound. The novel compounds are useful as surfactants, hydraulic fluids, water repellants, lubricants, and intermediates for siloxane gums and elastomers.

26 Claims, No Drawings

NOVEL ORGANOFUNCTIONAL SILICON COMPOUNDS SUBSTITUTED WITH HALOGEN AND PROCESSES FOR MAKING SAME

This invention relates to novel organofunctional silicon compounds having, bonded to silicon by carbon-to-silicon bond, a hydrocarbon group having a halogen atom and an organic group, bonded through oxygen, sulfur or nitrogen, attached to adjacent carbon atoms of the hydrocarbon group. The invention is also directed to novel processes for making such novel compounds.

This invention is based on the discovery that organofunctional silicon compounds containing, bonded to silicon by carbon-to-silicon linkage, at least one organofunctional group containing an organic group, bonded through oxygen, sulfur or nitrogen, and a halogen atom which are attached to vicinal carbon atoms of a hydrocarbon group bonded to silicon can be made by reacting an olefinically unsaturated silicon compound, a protolytic or active hydrogen atom containing compound and a positive halogen compound as shown by the equations:

(1) 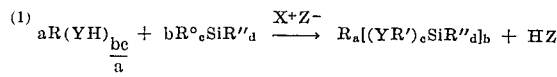

(2) 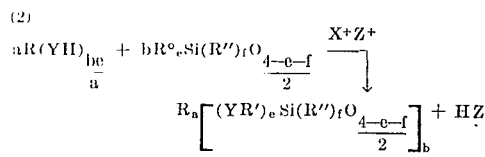

wherein $R(YH)_{bc/a}$ and $R(YH)_{be/a}$ are protolytic compounds, $R^\circ_c SiR''_d$ and $R^\circ_c Si(R'')_f O_{(4-c-f/2)}$ are the olefinically unsaturated silane and siloxane, respectively, and $X^+Z^-$ is the positive halogen compound wherein X is halogen of an atomic weight of at least 19, $Z^-$ is the negative part of the positive halogen compound and HZ is its hydrogenated form by-produced in the reaction.

More specifically, the following equations illustrate the reaction of trifluoroethanol, t-butyl hypochlorite and, respectively, vinyltrimethylsilane and 3-vinylheptamethylsiloxane:

(3) 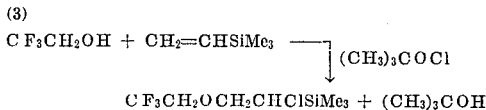

(4) 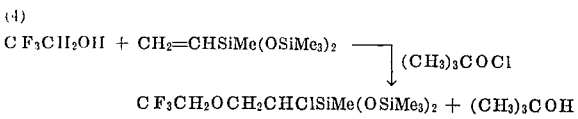

The novel organofunctional silicon compounds include silanes of the formula:

A.
$$R_a[(YR')_c SiR''_d]_b$$

and siloxane polymers and copolymers containing the unit of the formula:

(B) 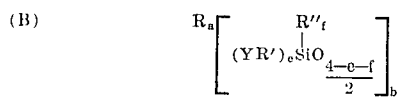

wherein $a$ is an integer of 1 to 3; $b$ is an integer of 1 to 6; $c$ is an integer of 1 to 4; $d$ is an integer of 0 to 3; $e$ is an integer of 1 to 3; $f$ is an integer of 0 to 2; R is a radical free of aliphatic unsaturation having a valence of 1 to 6, said valence being equal in the case of said silanes to $b$ times $c$ divided by $a$ and in the case of said siloxane polymers and copolymers to $b$ times $e$ divided by $a$, R being selected from the class consisting of hydrogen, monovalent hydrocarbon groups having one to 18 carbon atoms per group, substituted monovalent hydrocarbon groups having one to 18 carbon atoms per group substituted with substituents from the class consisting of halogen, alkoxy, cyano, nitro and hydroxy groups; substituted monovalent hydrocarbon groups substituted with a substituent having the formula $R^3 O(C_n H_{2n} O)_x-$ wherein $R^3$ is a monovalent hydrocarbon group having one to 18 carbon atoms, $n$ is an integer of 2 to 4, and $x$ is an integer of 1 to 100, and having one to 18 carbon atoms per group in addition to those in said substituent; acyl groups having one to 18 carbon atoms per group; substituted acyl groups substituted with a substituent from the class consisting of hydroxy, alkoxy groups having one to 18 carbon atoms per alkoxy group, and $R^3 O(C_n H_{2n} O)_x-$ groups and having one to 18 carbon atoms per group in addition to those of said substituent; divalent hydrocarbon groups having two to 18 carbon atoms; divalent groups of the formula $-(C_n H_{2n} O)_x C_n H_{2n}-$; divalent groups of the formula

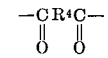

wherein $R^4$ is a divalent hydrocarbon group having two to 18 carbon atoms per group; divalent groups of the formula

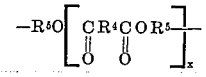

wherein $R^5$ is a divalent hydrocarbon group having two to 18 carbon atoms per group; divalent groups of the formula

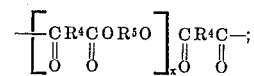

divalent groups of the formula

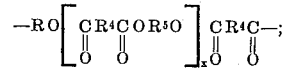

trivalent hydrocarbon groups having 3 to 18 carbon atoms per group; trivalent groups of the formula

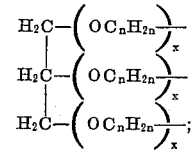

trivalent groups of the formula

wherein $R^6$ is a trivalent hydrocarbon group having three to 18 carbon atoms per group; tetravalent hydrocarbon groups having three to 18 carbon atoms per group; tetravalent groups of the formula

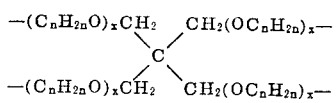

pentavalent hydrocarbon groups having four to 18 carbon atoms per group; pentavalent groups of the formula

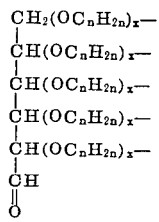

hexavalent hydrocarbon groups having four to 18 carbon atoms per group and hexavalent groups of the formula

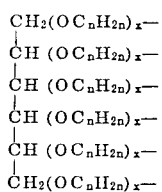

Y is a divalent element selected from the group consisting of —O—,

and —S— wherein R''' is selected from the group consisting of hydrogen and monovalent hydrocarbon having one to 18 carbon atoms; R' is a divalent halogen-substituted hydrocarbon group having two to 18 carbon atoms selected from the class consisting of alkylene, cycloalkylene and alkylenearylene groups, wherein said halogen substituent and said divalent element are bonded to adjacent non-aromatic carbon atoms; R'' is a monovalent organic group bonded to silicon and is selected from the class consisting of hydrocarbon groups, alkoxy groups, aryloxy groups, substituted hydrocarbon groups substituted with a substituent from the class consisting of halogen, alkoxy, acyl, acyloxy, cyano, nitro and hydroxy substituents, all of said groups having a total of one to 18 carbon atoms per group; $R^3(C_nH_{2n}O)_xC_nH_{2n}$— groups wherein $R^3$, $n$ and $x$ are as defined above and substituted hydrocarbon groups substituted hydrocarbon groups substituted with a $R^3O(C_nH_{2n}O)_x$— substituent and having one to 18 carbon atoms in addition to the carbon atoms in said substituent.

The novel siloxanes containing siloxy units of formula (B) can also contain siloxy units of the formula:
C)

wherein R'' is as defined above and $g$ is an integer of 0 to 3. Typical of the units represented by formula (C) are the $SiO_2$, monomethylsiloxy, dimethylsiloxy, trimethylsiloxy, monophenylsiloxy, methyl[butoxypoly(oxyethyleneoxypropylene)propyl]siloxy, diphenylsiloxy, triphenylsiloxy, methyl(methoxypolyoxyethylenepropyl)siloxy, beta-phenylethylsiloxy, methyl(hydrogen)-siloxy and methyl(ethyl)siloxy units. The novel siloxanes can contain 1 to 100 mol percent, preferably 10 to 60 mol percent, of units of formula (B) and 0 to 99 mol percent, preferably 40 to 90 mol percent, of units of formula (C).

Typical R'' groups shown in formulas (A), (B) and (C) are alkyl or cycloaliphatic groups, such as, methyl, ethyl, propyl, cyclopentyl, butyl, amyl, octyl, cyclohexyl, isopropyl, tert-butyl, octadecyl, isooctyl and the like, aryl groups, such as, phenyl, biphenyl, naphthyl and the like, aralkyl groups, such as, benzyl, beta-phenylethyl, beta-phenylpropyl, substituted aryl groups, e.g., halogen-substituted, alkoxy-substituted and aryloxy-substituted aryl groups, such as, chlorophenyl, trifluoromethylphenyl, phenoxyphenyl, chloronaphthyl, anisyl and the like, substituted aralkyl groups, e.g., halogen-substituted, alkoxy-substituted and aryloxy-substituted aralkyl groups, such as, chlorobenzyl, beta-anisylethyl, beta-phenoxynaphthylpropyl and the like, substituted alkyl groups, e.g., halogen-substituted, alkoxy-substituted, cyano-substituted and aryloxy-substituted alkyl groups, such as, gamma-chloropropyl, 3,3,3-trifluoropropyl, beta-cyanoethyl, gamma-methoxypropyl, and alkyl groups substituted with other functional groups which do not contain an active hydrogen, olefinic hydrocarbon groups, e.g., alkenyl and cycloalkenyl groups, such as, vinyl, allyl, 2-butenyl, cyclohexenyl, and the like.

The siloxane polymers containing siloxy units of the formula (B) with or without units of formula (C) can also contain silcarbane groups such as $\equiv Si(CH_2)_nSi\equiv$ and $\equiv SiC_6H_4Si\equiv$ groups, wherein at least one of the silicon bonds of said silcarbane groups is connected through Si—O—Si linkage to a siloxy groups of formula (B) or (C), if present in the polymer, and the remaining silicon bonds of the silcarbane group are bonded in the same way or to an R'' group.

When there are two or more R groups in the molecule of the novel compounds of this invention, such R groups may be the same or different in the same molecule. When there are two or more —YR'— groups in the same molecule, they also may be the same or different and when there are two or more R'' groups in the same molecule, they too can be the same or different. When there are two or more siloxy units of formula (B) in the same molecule, such units can be the same or different throughout the same molecule. Likewise, when there are two or more siloxy units of formula (C), such units can be the same or different in the same molecule.

According to our studies the reactions depicted in equations (1) and (2) are general and are applicable to all organosilicon compounds having olefinic unsaturation. Typical olefinically unsaturated silanes are represented by the formula:
D)

and typical siloxanes are represented by the formula:
E)

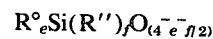

with or without units of formula (C) wherein R'', $c$, $d$, $e$ and $f$ are as defined above and $R°$ is an olefinically unsaturated organic group bonded to silicon by silicon-to-carbon bond, such as, alkenyl, e.g., vinyl, allyl, oleyl and the like, cycloalkenyl, e.g., cyclopentenyl, cyclohexenyl and the like, and alkenylaryl, e.g., styryl, alpha-methyl-styryl and the like. Specific examples of olefinically unsaturated silanes include CH$_2$=CHMeSi(OEt)$_2$, CH$_2$=CHSi(OEt)$_3$, CH$_2$=CHSiMe$_3$, CH$_2$=CHSiMeEt$_2$, CH$_2$=CH(C$_6$H$_5$)MeSiOEt, CH$_2$=CH(CF$_3$CH$_2$CH$_2$)Si(OEt)$_2$, CH$_2$=CH(MeOCH$_2$)SiMeOMe, CH$_2$=CH(C$_6$H$_5$)$_2$SiOEt, CH$_2$=CHCH$_2$SiMe$_3$, CH$_2$=CHCH$_2$Si(OMe)$_3$, C$_6$H$_9$SiMe(OEt)$_2$, wherein C$_6$H$_9$ is cyclohexenyl, and the like.

Specific examples of olefinically unsaturated siloxanes are illustrated by the following formulas wherein Vi is vinyl, C$_6$H$_9$ is cyclohexenyl, and $r$ and $s$ are each integers of 1 to 100:

(Me$_3$SiO)$_2$MeSiVi, Me$_3$SiOSiMe$_2$Vi, (MeViSiO)$_4$ (Vi is vinyl),
(Me$_3$SiO)$_3$SiVi, Me$_3$SiO(MeViSiO)$_r$(Me$_2$SiO)$_s$SiMe$_3$
Me$_3$SiO(C$_6$H$_9$SiMeO)$_r$(Me$_2$SiO)$_s$SiMe$_3$ (C$_6$H$_9$ is cyclohexenyl),
Me$_3$SiO[(C$_6$H$_5$)ViSiO]$_r$[(C$_6$H$_5$)$_2$SiO]$_s$SiMe$_3$,
Me$_3$SiO[ViMeSiO]$_r$[(C$_6$H$_5$)$_2$SiO]$_s$SiMe$_3$,
EtO(Me$_2$SiO)$_r$(MeViSiO)$_s$Et.

Protolytic compounds, R(YH)$_{bc/a}$ and R(YH)$_{be/a}$, useful in this invention include hydroxy compounds, such as, water, alcohols, polyols, phenols, carboxylic acids, polycarboxylic acids, and the like.

The alcohols and phenols may be monomeric or polymeric and may be represented by ROH where R is as defined above including alkanols, e.g., methyl, ethyl, i-propyl, t-butyl, cyclohexyl, octadecyl alcohols and the like; substituted alkanols, substituted with halogen, alkoxy, cyano, nitro, hydroxy, or R$^3$O(C$_n$H$_{2n}$O)$_x$— groups wherein R$^3$, $n$ and $x$ are as defined above, e.g., 2,2,2-trifluoroethyl, 1H,1H-perfluorooctyl, 2-cyanoethyl, 2-cyano-2-propyl, 1,1,1-tribromo-2-methyl-2-propyl, 2-(2-methoxyethoxy)ethyl alcohols and the like; aryl and substituted aryl hydroxy compounds, e.g., phenol, toluol, p-chlorophenol, 2,4,6-tribromophenol, m-nitrophenol, and the like; aralkanols, e.g., benzyl alcohol, cinnamyl alcohol, benzhydrol, triphenylcarbinol and the like. It is preferred that the protolytic compound be free of alkenyl or alkynyl groups.

Polyols include di-, tri, or higher hydroxy organic compounds and can be monomeric or polymeric, e.g., 1,2-ethanediol, 1,2-propanediol; 1,4-butanediol, glycerol, pentaerythritol, sorbitol, sucrose, glucose, pinacol, 1,2,4-butanetriol, 1,2,6-hexanetriol, 1,10-decanetriol, polyoxyalkylene glycols HO(C$_n$H$_{2n}$O)$_x$C$_n$H$_{2n}$OH, e.g., HO(C$_2$H$_4$O)$_{16}$H, sorbitol started polyalkylene-oxide adducts, e.g.,

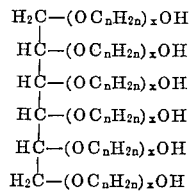

wherein $n$ is 2 or 3 or 4 and $x$ is 1 to 100, e.g., 1, 5, 10, 12 and 18; glycerol started polyalkylene-oxide adducts, e.g.,

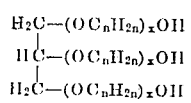

wherein $n$ and $x$ are as described above; pentaerythritol started polyalkylene-oxide adducts, such as,

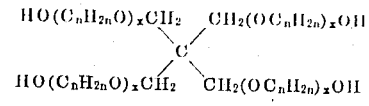

wherein $n$ and $x$ are as defined above; glucose or sorbose started polyalkylene-oxide adducts, such as,

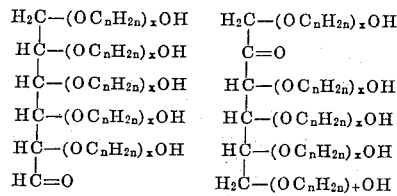

wherein $n$ and $x$ are as defined above; glycol terminated polyesters, such as

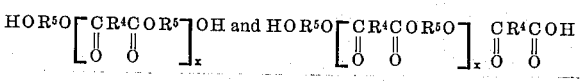

wherein R$^4$, R$^5$ and $x$ are as defined above, e.g., ethylene glycol-terephthalate polyesters made from equimolar or greater amounts of glycol, polyvinyl alcohol, and the like.

The carboxylic acids include monocarboxylic acids,

e.g., the alkanoic acids including acetic acid, octadecanoic acid, formic acid and the like; the substituted alkanoic acids substituted with hydroxy, alkoxy, aryl or R$^3$O(C$_n$H$_{2n}$O)$_x$— groups wherein R$^3$, $n$ and $x$ are as defined above including methoxyacetic acid, benzoic acid, HOCH$_2$CO$_2$H, trifluoroacetic acid, glutamic acid, gluconic acid, pyruvic acid, salicylic acid, ascorbic acid, HOC$_6$H$_4$CO$_2$H, lactic acid, thioglycolic acid, cyanoacetic acid, phenylacetic acid, chloropropionic acid, bromoacetic acid, and the like. The polycarboxylic acid include HOOCR$^4$COOH wherein R$^4$ is as defined above, such as, oxalic acid, adipic acid, tartaric acid, malonic acid, succinic acid, phthalic acid, malic acid, tetrahydrophthalic acid, ortho-phenyleneacetic-beta-propionic acid, phenylenediacetic acid, hydrocinammic acid, epsilon-phenyl-n-caproic acid, and R$^6$(COOH)$_3$ wherein R$^6$ is as defined above, such as, carboxysuccinic acid, trimellitic acid, citric acid, trimesic acid, diphenic acid and the like; acid terminated polyesters such as

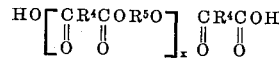

wherein R$^4$, R$^5$ and $x$ are as defined above, e.g., ethylene glycol-terephthalate polyesters made from equimolar or greater amounts of dicarboxylic acid and the like.

Protolytic compounds R(YH)$_{bc/a}$ and R(YH)$_{be/a}$ also include amines and mercaptans. The amines have the formula

wherein R and R''' are as defined above and include methylamine, ethylene diamine, diethylenetriamine, pentaethylenehexamine, aniline, hexamethylenediamine, ethanolamine, diethanolamine, laurylamine, di-n-propylamine, diphenylamine, piperidine, morpholine, diethylamine and the like. The mercaptans have the formula $R(SH)_{1-6}$ wherein R is defined above and includes methane thiol, dodecane thiol, octadecane thiol, orthomercaptobenzoic acid, phenylmercaptan, alpha-toluenethiol, thioacetic acid, thiobenzoic acid and the like.

Positive halogen compounds, $X^+Z^-$, are defined as materials in which the halogen is the positive end of a dipole in a molecule in which the remainder of the molecule is a nucleophile. (E. S. Gould, Mechanism and Structure in Organic Chemistry, Holt, Rinehart and Winston, 1959, New York.) They are considered to be nucleophilic carriers of halogen, i.e., positive halogen carriers. Examples include: alkyl hypohalites, e.g., t-butyl hypochlorite, trifluoromethyl hypofluorite, and the like; acyl hypohalites, e.g., acetyl hypobromite; N-haloamines, e.g., N,N dichloro-t-butylamine; N-haloamides, e.g., N,N-dibromobenzenesulfonamide, N,N-dichlorobenzenesulfonamide, N-bromo-acetamide, N-chloroacetamide; N-haloimides, e.g., N-chlorophthalimide, N-chlorosuccinimide, N-bromosuccinimide, 1,3-dichloro-5,5-dimethylhydantoin, 1-bromo-s-triazine-2,4,6(3H,5H)-trione(bromoisocyanuric acid); 1-haloalkynes, e.g., 1-bromohex-1-yne;α-halocarbonyl compounds, e.g., 2,2-dibromomalonic ester, 3,3-dichloropentane-2,4-dione, halonitromethanes, e.g., chlorotrinitromethane, dibromodinitromethane; halocyanomethanes, e.g., bromotricyanomethane; halomethane, e.g., bromotrifluoromethane; haloacylmethanes; activated haloaromatic compounds, e.g., 2,4,6-trinitrochlorobenzene; nitryl halides, sulfenyl halides, e.g., trichloromethanesulfenylchloride. The molecular halogens and interhalogen compounds excluding molecular fluorine are also useful as sources of positive halogen: $Cl_2$, $Br_2$, $ClBr$, $BrI$ as well as the inorganic hypohalites, e.g., $NaOBr$, $Ca(OCl)_2$, $LiOCl$. Any of the above compounds can be used herein.

Other suitable positive halogen compounds are oxyalkylene hypohalites, which are represented by the formula: $R^7O(C_nH_{2n}O)_xCOX$ wherein $R^7$ is X or $R^3$ as defined above, X is a halogen having an atomic weight of at least 19, n has a value of from 2 to 4 and x has a value of from 1 to about 100, preferably n is 2 or 3. Copolymers where n is a mixture of ethylene and propylene units are also suitable.

The process of this invention requires one equivalent of "positive halogen" from the positive halogen compound per mol of olefinic group connected to silicon for complete reaction of the olefinic unsaturation of the silicon compound. The positive halogen compound and silicon compound can be brought together in any ratio depending on the effect desired or product sought. A 1:1 ratio is preferred as an excess of positive halogen compound may lead to undesirable side reactions, e.g., excess halogenation of product, especially in the presence of hydroxylic compounds that are not too difficult to halogenate, such as ethanol. A deficiency of positive halogen leads to incomplete reactions.

With added protolytic materials, the positive halogen compound promotes the addition of the protolytic material with little if any production of product which normally would be formed from the positive halogen compound and silicon compound. The silicon compound, the protolytic material and positive halogen compound may be brought together in any ratio whatsoever, the chosen ratio depending on the effect desired or product sought. The preferred ratio of positive halogen compound to olefinically unsaturated silicon compound is 1:1 with an excess of protolytic compound. With an excess of either the protolytic material or the silicon compound, the positive halogen compound preferably should be equimolar with the limiting reagent.

The ratio of added protolytic material to positive halogen compound and olefinically unsaturated silicon compound is important. The rate of reaction, yield and purity of adduct are increased with larger excesses of protolytic material. Examples 1 and 4 illustrate that at a 6:1:1 ratio, reaction time was 30 minutes and yield of adduct was 75 percent; whereas at 1:1:1 ratio, reaction time was two months and yield of adducts was 53 percent. These effects are also illustrated in Examples 15, 16 and 17.

Catalysts are not required but may be used, if desired, to improve reaction times and yields. Addition of protolytic compounds having acidic hydroxylic groups, e.g., 2,2,2-trifluoroethanol, acetic acid, phenol, etc., are catalyzed by basic materials, e.g., potassium t-butoxide, potassium silanolate, tetramethyl ammonium silanolate, pyridine, bis-triphenylphosphine platinum (II) chloride, triphenylphosphine and pyridine-N oxide. Examples 1 and 2 illustrate the reduction in time of reaction from 4 days to 30 minutes by the use of catalysts. Many other basic materials and possibly other classes of compounds would also be effective.

Reactions of essentially neutral protolytic materials, e.g., methanol, ethanol, 2-propanol and 2-methoxyethanol were catalyzed by cupric acetate and benzene-sulfonic acid. For 2-methoxyethanol, cobaltic acetate was found to be a catalyst.

Solvents are not required but may be used if desired, especially for making reactants compatible and for moderating those reactions which proceed rapidly and exothermically. Any organic solvent that does not contain active hydrogen atoms may be used. Such solvents include the aliphatic and aromatic hydrocarbons, ketones, esters, nitriles and nitro compounds. The preferred solvents are the hydrocarbons, e.g., n-hexane, benzene, toluene; chlorinated hydrocarbons, e.g., dichloromethane, carbon tetrachloride, esters, e.g., ethyl acetate and nitrobenzene.

Any sequence of mixing may be used for the reactants. Since positive halogen compounds readily chlorinate many organic materials, the preferred order of addition is to introduce the positive halogen compound to a mixture of the olefinically unsaturated silicon compound and the protolytic material. It may also be desired to control the rate and temperature of reaction by the rate of addition of the positive halogen compounds.

The process of this invention may be carried out over a wide range of conditions. It may be accomplished at temperatures from $-100°$ to $200°C.$, the only limit being the decomposition temperature of the reactants, especially the positive halogen compound. Pressures above, below or at atmospheric pressures may be used. The preferred reaction conditions are at atmospheric pressure and from −70° to 100°C. During the reaction, it is preferred that light be excluded.

Reaction time varies from a few minutes to a few days depending upon both the positive halogen compounds, and the protolytic material used, the catalyst and also temperature. When the positive halogen compound is employed in a 1:1 molar ratio of positive halogen to olefinically unsaturated group, the reaction can be followed by measuring the presence or absence of positive halogen.

The process of this invention is superior to heretofore known methods of preparing organofunctional silicones in that there results (1) improved yields, (2) shorter reaction times, (3) greater versatility and (4) low reaction temperatures. The present invention provides advantageous procedures for preparing a wide range of organofunctional materials. For example, the present invention permits the preparation of resinous or rubbery materials at ambient temperatures, thus providing novel coating, potting and molding compositions.

The novel monomeric and polymeric compounds produced by the process of the present invention are useful as intermediates in the production of organofunctional silicon compounds and other organic derivatives thereof. The liquid monomers of this invention can be used as sizes for fibrous materials, e.g., for glass fibers and organic textiles to impart water repellency and lubricity thereto, and as intermediates for the production of siloxane polymers and copolymers. The novel siloxane polymers and copolymers produced as oils are useful themselves as lubricants. Those polymers and copolymers produced as resins are useful as coatings to prevent corrosion, encapsulating materials for electronic components and the like. Those siloxanes produced as gums are useful in the production of silicone elastomers in the conventional manner for those applications in which the well known silicone elastomers are employed. The novel siloxane polymers and copolymers can be employed as modifying ingredients for known silicone lubricating oils and to modify silicone elastomers. The siloxane polymers and copolymers can also be produced as semi-solids useful in themselves as adhesives and as grease-modifiers.

The novel siloxane polymers and copolymers made from silicon compounds having three or more olefinic groups to the molecule and/or protolytic compounds having three or more active hydrogen atoms to the molecule are cross-linked in nature and set to solid materials useful as protective coatings. Also, the solid polymers and copolymers of this invention can be used as grease thickeners and as additives or modifying ingredients for the known thermosetting polysiloxanes.

Products with very low surface tensions were prepared in the Examples and are useful as surfactants, defoamers, etc. Silicone-alcohols, which also are useful as surfactants, are prepared by the method illustrated in Example 12. A persistent flame retardant additive for silicone rubber was prepared in Example 14.

The halo group in the products of this invention are useful in nucleophile displacement reactions, e.g., in the preparation of ethers by reaction with sodium alkoxides.

In addition, the process of this invention provides an improved method for bringing about ambient temperature polymerization and "curing" of organosiloxane materials both with and without filler. As shown in Example 20, ethylene glycol and t-butyl hypochlorite cause curing of a vinylmethyl-dimethylsiloxane fluid in 1 day. Thus, room temperature vulcanization systems, which do not require atmospheric moisture and which have reasonable pour and cure times can be prepared.

Other uses for the process and products of this invention include coating of fillers, preparation of silicone alkyd resins, sizing of paper, treatment of cotton fabric to impart water repellency, and the like. The fluid products are useful as hydraulic fluids, coolants and lubricants. The solid products are useful, in pulverized condition, as filler materials in molding compositions, paints, potting compositions and the like.

The following Examples are presented. In these Examples boiling points, b.p., are in °C. measured at the reduced pressure indicated in mm of Hg, $MR_D$ is molar refraction, using sodium light, $R_D$ is specific refraction which is molar refraction divided by molecular weight ($MR_D/MW$), V.P.C. means vapor phase chromatography, the ratios in parentheses in the titles are the molar ratios of the protolytic material to the alkenylsiloxane to the positive halogen compound, $n_D^{25}$ is index of refraction using sodium light at 25°C., $d_4^{25}$ is specific gravity measured at 25°C. referred to water at 4°C., Ac means the acetyl group, $CH_3C(O)-$, Me means the methyl group, Et means the ethyl group, t-Bu means the tertiary butyl group, and 2-Pr means the 2-propyl group. Parts and percentages are by weight.

EXAMPLE 1

Addition of Trifluoroethanol to 3-Vinylheptamethyltrisiloxane with t-Butyl Hypochlorite (6:1:1) in Presence of Catalyst In a 500 ml. flask fitted with a sealed stirrer, an addition funnel and an adapter with thermocouple well and condenser were placed 3-vinylheptamethyltrisiloxane (24.8 grams, 0.1 mol), 2,2,2-trifluoroethanol (60.0 g., 0.6 mol) and t-butyl hypochlorite (10.85 g., 0.1 mol) in 120 ml. of anhydrous benzene. The contents of the flask were protected from light by a covering of aluminum foil. Also, the temperature of the contents was continuously recorded. Addition of two drops of potassium silanolate (containing 2.9 percent K) caused an exothermic reaction with a 30°C. rise in temperature within four minutes. No t-butyl hypochlorite was detected thirty minutes after the addition of catalyst, using starch-iodide test paper. The material was distilled to give 28.8 grams (75 mol-% yield) of 3-[2-(2,2,2-trifluoroethoxy)-1-chloroethyl]heptamethyltrisiloxane, b.p. 46°/0.1 mm., $n_D^{25}$= 1.3973, $d_4^{25}$ = 1.404, surface tension 20.1 dynes/cm. (Purity by vapor phase chromatography — 95 percent.)

Analysis: Calculated for $CF_3CH_2OCH_2CHCl\text{-}SiMe(OSiMe_3)_2$: C, 34.5 percent; H, 6.8 percent; Si, 22.0 percent; Cl, 9.3 percent; F, 14.9 percent; $R_D$, 0.2309. Found: C, 34.0 percent; H, 6.9 percent; Si, 21.4 percent; Cl, 9.8 percent; F, 14.6 percent; $R_D$, 0.2316. Both infrared and nuclear magnetic resonance spectra confirmed the assigned structure.

EXAMPLE 2

Addition of Trifluoroethanol to 3-Vinylheptamethyltrisiloxane with t-Butyl Hypochlorite (6:1:1) Without Catalyst t-Butyl hypochlorite (21.7 grams, 0.2 mol) was added to a solution of 3-vinylheptamethyltrisiloxane (49.6 g., 0.2 mol) and 2,2,2-trifluoroethanol (120 g., 1.2 mol) in 100 ml. of benzene. An exothermic reaction resulted (18° temperature rise). After standing 4 days, no positive halogen was detected. The material was distilled to yield 54.9 grams (72 mol-% yield) of 3-[2-(2,2,2-trifluoroethoxy)-1-chloroethyl]heptamethyltrisiloxane, b.p. 42°–45°/0.1 mm.; $n_D^{25}$, 1.3993 (purity by V.P.C. — 84 percent).

EXAMPLE 3

Addition of Trifluoroethanol to 3-Vinylheptamethyltrisiloxane with t-Butyl Hypochlorite (3:1:1) in Presence of Catalyst Addition of a drop of potassium silanolate (2.9 percent K) to a solution of 24.8 grams (0.1 mol) of 3-vinylheptamethyltrisiloxane, 15.0 g. (0.15 mol) of 2,2,2-trifluoroethanol and 0.85 g. (0.1 mol) of t-butyl hypochlorite in 110 ml. of benzene resulted in an exothermic reaction (9°C. rise). After 2 hours, the mixture had returned to room temperature but still contained t-butyl hypochlorite, an additional 15 g. (0.15 mol) of trifluoroethanol was added and an exothermic reaction commenced (6°C. rise in temperature). No positive halogen was detected after standing overnight.

After distillation, 3-[2-(2,2,2-trifluoroethoxy)-1-chloroethyl]heptamethyltrisiloxane was isolated: 30.5 grams (80 mol-% yield), b.p. 46°/0.1 mm., $n_D^{25}$, 1.3970 (purity by V.P.C. — 86 percent)

EXAMPLE 4

Addition of Trifluoroethanol to 3-Vinylheptamethyltrisiloxane with t-Butyl Hypochlorite (1:1:1) in Presence of Catalyst To a mixture of 24.8 grams (0.1 mol) of 3-vinylheptamethyltrisiloxane, 10.0 g. (0.1 mol) of 2,2,2-trifluoroethanol and 10.85 g. (0.1 mol) of t-butyl hypochlorite in 125 ml. of benzene were added two drops of potassium silanolate (2.9 percent K). An exothermic reaction resulted (4°C. rise). After 1 month, the mixture still contained positive halogen but was free of positive halogen after an additional six weeks. Distillation gave 20.2 g. (53 mol-% yield) of 3-[2-(2,2,2-trifluoroethoxy)-1-chloroethyl]heptamethyltrisiloxane, b.p. 46°–48°/0.15 mm., $n_D^{25}$, 1.3979 (purity by V.P.C. — 72 percent).

EXAMPLE 5

Addition of Trifluoroethanol to Vinyltrimethylsilane with t-Butyl Hypochlorite (6:1:1)

To a mixture of 20.04 g. (0.2 mol) of vinyltrimethylsilane and 120 g. (1.2 mol) of 2,2,2-trifluoroethanol in 75 ml. of benzene were added dropwise 21.7 g. (0.2 mol) of t-butyl hypochlorite over a 1 hour period. The exothermic reaction was maintained at 50°C. by the rate of addition. No t-butyl hypochlorite was detected within an additional hour. After distillation, 22.4 g. (47 mol-% yield) of 2-(2,2,2-trifluoroethoxy)-1-chloroethyltrimethylsilane, b.p. 65°/15 mm., $n_D^{25}$, 1.4083, $d_4^{25}$, 1.1094, were isolated. (Purity by V.P.C. — 94 percent.) Analysis: Calculated for $CF_3CH_2OCH_2CHClSiMe_3$: C, 35.8 percent; H, 6.0 percent; Si, 11.9 percent; Cl, 15.1 percent; F, 24.3 percent; $R_D$, 0.2175. Found: C, 35.5 percent; H, 6.3 percent; Si, 10.8 percent; Cl, 18.6 percent; F, 18.3 percent; $R_D$, 0.2225. Nuclear magnetic resonance and infrared spectra confirmed the assigned structure.

EXAMPLE 6

Addition of Trifluoroethanol to 3-(3-Cyclohexenyl)heptamethyltrisiloxane with t-Butyl Hypochlorite (6:1:1)

t-Butyl hypochlorite (10.85 g., 0.1 mol) was added dropwise over a half hour period to a solution of 3-(3-cyclohexenyl)heptamethyltrisiloxane (30.25 g., 0.1 mol) and 2,2,2-trifluoroethanol (60.0 g., 0.6 mol) in 75 ml. of benzene. An exothermic reaction resulted (30°C. rise) and no positive halogen was detected after 2 hours. A small amount of isobutylene was detected in the gas over the reaction. The product solution was distilled to yield 23.0 g. (53 mol-% yield) of 3-[(2,2,2-trifluoroethoxy-)chlorocyclohexyl]heptamethyltrisiloxane, b.p. 86°/0.15 mm., $n_D^{25}$, 1.4092, $d_4^{25}$, 1.0385 (purity by V.P.C. — 75 percent). Analysis: Calculated for $CF_3CH_2OC_6ClH_9Si(OSiMe_3)_2$: C, 41.2 percent; H, 7.4 percent; Si, 19.3 percent; Cl, 8.1 percent; F, 13.0 percent; $R_D$, 0.2398. Found: C, 39.9 percent; H, 7.3 percent; Si, 18.4 percent; Cl, 7.7 percent; F, 12.0 percent; $R_D$, 0.2382. Infrared spectrum confirmed the assigned structure.

EXAMPLE 7

Addition of Trifluoroethanol to Vinylmethylcyclosiloxanes with t-Butyl Hypochlorite (6:1:1) in Presence of Catalyst To a solution of 43 g. (0.5 mol) of vinylmethylcyclosiloxanes (mostly trimers and tetramers) and 300 g. (3.0 mol) of 2,2,2-trifluoroethanol in 300 g. of toluene were added 54.3 g. (0.5 mol) of t-butyl hypochlorite. Benzene-sulfonic acid (0.5 g.) was added as catalyst. An exothermic reaction occurred and the temperature rose 15°C. After standing overnight, the mixture was distilled to give two fractions of 2-(2,2,2-trifluoroethoxy)-1-chloroethylmethylcyclosiloxanes (mostly trimers and tetramers);

1. 18.3 g., b.p. 137°–190°/0.1–0.7 mm., $n_D^{25}$, 1.4118, $d_4^{25}$, 1.3662; and
2. 38.8 g., b.p. 190°–205°/0.7–0.5 mm., $n_D^{25}$, 1.4173, $d_4^{25}$, 1.3860. Overall yield was 52 mol-%. Analysis: Calculated for $CF_3CH_2OCH_2CHClSiMeO$: C, 27.2 percent; H, 3.7 percent; Si, 12.7 percent; F, 25.8 percent; Cl, 16.1 percent; $R_D$, 0.1793. Found: C, 28.5 percent, 27.7 percent; H, 4.1 percent, 3.8 percent; Si, 17 percent, 14.5 percent; F, 24 percent, 23 percent; Cl, 13.9 percent; 15.1 percent; $R_D$, 0.1820, 0.1816. The values for fraction 1 are given first and then those for fraction 2. The infrared spectra confirmed the assigned structure.

EXAMPLE 8

Addition of 1H, 1H-Perfluorooctanol to 3-Vinylheptamethyltrisiloxane with t-Butyl Hypochlorite (2:1:1) in Presence of Catalyst t-Butyl hypochlorite (4.07 g., 0.0375 mol) was added to a mixture (two phases) of 1H, 1H-perfluorooctanol (30.0 g., 0.075 mol) and 3-vinylheptamethyltrisiloxane (9.30 g., 0.0375 mol) in 15 ml. of benzene. A few crystals of potassium t-butoxide catalyst had been added prior to hypochlorite addition. The reaction was exothermic and after standing 1 day no positive halogen was detected. The material was concentrated and distilled to give 20.4 g. (80 mol-% yield) of 3-[2-(1H, 1H-perfluorooctyloxy)-1-chloroethyl]heptamethyltrisiloxane, b.p. 88°/0.1 mm., $n_D^{25} = 1.3651$ $d_4^{25} = 1.3001$, surface tension, 18.9 dynes/cm. Purity by V.P.C. — 80 percent. Analysis: Calculated for $C_7F_{15}CH^2OCH_2CHClSiMe(OSiMe_3)_2$ · C, 35.2 percent; H, 3.8 percent; Si, 12.3 percent; Cl, 5.2 percent; F, 41.7 percent; $R_D$, 0.1720. Found: C, 29.8 percent; H, 4.0 percent; Si, 11.9 percent; Cl, 5.1 percent; F, 40.1 percent; $R_D$, 0.1719. Infrared spectrum confirmed the assigned structure.

EXAMPLE 9

Addition of Ethanol to Vinylmethyldiethoxysilane with t-Butyl Hypochlorite (6:1:1) in Presence of Catalyst t-Butyl hypochlorite (54.0 g., 0.5 mol) was added dropwise to a solution of vinylmethyldiethoxysilane (80 g., 0.5 mol) in ethanol (132 g., 3.0 mols). The reaction was catalyzed by 0.5 g. of benzene-sulfonic acid. An exothermic reaction resulted and was controlled (30°–55 °C.) by rate of addition. The reaction was allowed to proceed for 2 hours. Distillation gave 32 g. (27 mol-% yield) of 2-ethoxy-1-chloroethylmethyldiethoxysilane, b.p. 97°–100°/9 mm., $n_D^{25}$, 1.4279, $d_4^{25}$, 1.020 g/ml. Analysis: Calculated for $EtOCH_2CHClSiMe(OEt)_2$: C, 44.9 percent; H, 8.8 percent; Si, 11.6 percent; Cl, 14.7 percent; $R_D$, 0.2557. Found: C, 43.1 percent; H, 8.5 percent; Si, 11.8 percent; Cl, 14.7 percent; $R_D$, 0.2522. Infrared spectrum was in accord with the assigned structure.

EXAMPLE 10

Addition of Ethanol to 3-Vinylheptamethyltrisiloxane with t-Butyl Hypochlorite (6:1:1) in Presence of Catalyst To a solution of 24.8 g. (0.1 mol) of 3-vinylheptamethyltrisiloxane and 27.6 g. (0.6 mol) of absolute ethanol containing a few crystals of copper (II) acetate were added 10.85 g. (0.1 mol) of t-butyl hypochlorite. The reaction was exothermic and controlled by both rate of addition of hypochlorite and external cooling (maximum temperature 78°C.). After 50 minutes no positive halogen or acidity was detected. The material was distilled to give 20.4 g. (62 mol-% yield) of 3(2-ethoxy-1-chloroethyl)heptamethyltrisiloxane, b.p. 48°–50/0.1 mm., $n_D^{25}$, 1.4185, $d_4^{25}$, 0.9572, purity by V.P.C. — 69 percent. Analysis: Calculated for $CH_3CH_2OCH_2CHClSiMe(OSiMe_3)_2$: C, 40.2 percent; H, 8.9 percent; Si, 25.6 percent; Cl, 10.8 percent; $R_D$, 0.2678. Found: C, 38.0 percent; H, 8.4 percent; Si, 24.6 percent; Cl, 13.1 percent; $R_D$, 0.2635. The infrared spectrum confirmed the assigned structure.

EXAMPLE 11

Addition of Ethanol to Vinyltriethoxysilane with N-Bromosuccinimide (1.1:1:1) Without Catalyst To a mixture of 93.5 g. (0.49 mol) of vinyltriethoxysilane and 25.3 g. (0.55 mol) of absolute ethanol were added 89 g. (0.5 mol) of N-bromosuccinimide with 200 ml. of carbon tetrachloride as solvent. After standing two weeks, the mixture was evaporated, filtered and distilled to give 96.4 g. (62 mol-% yield) of 2-ethoxy-1-bromoethyltriethoxysilane, b.p. 55°/1 mm., $n_D^{25}$, 1.4357, $d_4^{25}$, 1.2021. Analysis: Calculated for $EtOCH_2CHBrSi(OEt)_3$: C, 38.1 percent H, 7.4 percent; Si, 8.9 percent; Br, 25.4 percent; $R_D$, 0.2220. Found: C, 36.9 percent; H, 7.4 percent; Si, 8.8 percent; Br, 28 percent; $R_D$, 0.2173. An infrared spectrum confirmed the assigned structure.

EXAMPLE 12

Addition of Ethylene Glycol to Vinyltrimethylsilane with t-Butyl Hypochlorite (3:1:1) in Presence of Catalyst t-Butyl hypochlorite (21.7 g., 0.2 mol) was added to a mixture of vinyltrimethylsilane (20.0 g., 0.2 mol) and 1,2-ethanediol (36.0 g., 0.6 mol) in 50 ml. of anhydrous acetone which contained a few crystals of copper (II) acetate (two phase mixture). After a 5 minute induction period, an exothermic reaction occurred which was controlled by the rate of addition and external cooling (maximum temperature 50°C.). No positive halogen was detected after twenty hours but the mixture was acidic. Anhydrous pyridine (2.0 g.) was added and the resulting precipitate removed by filtration. Distillation gave 29.2 g. of 2-(2-hydroxyethoxy)-1-chloroethyltrimethylsilane, b.p. 48°/0.25 mm., $n_D^{25}$, 1.4408, $d_4^{25}$, 1.0942. Found $R_D$, 0.2412, Calculated $R_D$, 0.2457. Analysis by gas chromatography showed the product to be a mixture. The two principal components were separated by V.P.C. and infrared scans of the pure components were recorded. One of the materials was 2-(2-hydroxyethoxy)-1-chloroethyltrimethylsilane and the other was 1,2-ethanediol.

EXAMPLE 13

Addition of Acetic Acid to Vinylmethyldiethoxysilane with t-Butyl Hypochlorite (6:1:1) in Presence of Catalyst To a solution of 80.0 g. (0.5 mol) of vinylmethyldiethoxysilane and 180 g. (3.0 mols) of glacial acetic acid were added dropwise 54.0 g. (0.5 mol) of t-butyl hypochlorite. The reaction was catalyzed by 0.5 g. of benzene-sulfonic acid. Temperature was maintained at 25° to 50° by rate of addition for 2 hours. The material was distilled to yield 59 g. (46 mol-%) of 2-acetoxy-1-chloroethylmethyldiethoxysilane, b.p. 114°–115°/9–10 mm., $n_D^{25}$, 1.4314, $d_4^{25}$, 1.0744. Analysis: Calculated for AcOCH$_2$CHClSiMe(OEt)$_2$: C, 42.4 percent; H, 7.5 percent; Si, 11.0 percent; Cl, 13.9 percent; $R_D$, 0.2416. Found: C, 42.2 percent; H, 7.5 percent; Si, 11.0 percent; Cl, 14.5 percent; $R_D$, 0.2411. The infrared spectrum was in accord with the proposed structure.

EXAMPLE 14

Addition of Tribromophenol to an Me$_3$SiO(MeViSiO)$_{10}$SiMe$_3$ with t-BuOCl (10:10:1) in Presence of Catalyst To a solution of 99.1 g. (0.3 mol) of 2,4,6-tribromophenol and 30.7 g. (0.03 mol) of decavinylhexadecamethyldodecasiloxane (equilibrated) in 250 ml. of benzene were added 32.5 g. (0.3 mol) of t-butyl hypochlorite. The temperature rose 5° C. during the addition. After 5 days, the reaction was incomplete and two drops of pyridine were added as a catalyst. The temperature rose 20° and within 3 hours no positive halogen was detected. After concentration, 140 g. of crude product, Me$_3$SiO(C$_6$H$_2$Br$_3$OCH$_2$CHClSiMeO)$_{10}$SiMe$_3$, were isolated. (Theoretical — 135 grams.)

A small amount of tribromophenol remained and was removed by trituration with methanol. Further trituration with acetone gave a crystalline solid which imparted flame retardant properties to silicone rubber. A similar amount of 2,4,6-tribromophenol completely inhibited cure in the siloxane rubber.

EXAMPLE 15

Effects of Reaction Variables on the Preparation of CF$_3$CH$_2$OCH$_2$CHClSiMe(OSiMe$_3$)$_2$ and CF$_3$CH$_2$OCH$_2$CHClSiEt$_3$ The effects of catalysts, concentration, solvent and temperature were studied. All reactions were carried out in washed Pyrex vessels and were protected from light. Early experiments showed that soft glass was an effective catalyst for the addition of trifluoroethanol but soft glass which had been soaked in dilute hydrochloric acid and washed was not catalytic. However, Pyrex glass was not catalytic.

To a standardized solution of undecane and either 3-vinylheptamethyltrisiloxane or vinyltriethylsilane was added the appropriate quantity of trifluoroethanol. Catalyst and/or solvent, if used, were introduced before the addition of the calculated amount of t-butyl hypochlorite. After thirty minutes the reaction mixture was analyzed. The findings are summarized below.

CATALYSTS

For 3-vinylheptamethyltrisiloxane the following catalysts were effective (in decreasing order of activity, first three are nearly equal): potassium t-butoxide, tetramethylammonium silanolate, potassium silanolate, pyridine, bis-triphenylphosphine platinic chloride, triphenyl phosphine, and pyridine N-oxide. Acidic materials, e.g., benzene-sulfonic acid, trifluoroacetic acid, zinc chloride and 1,3-bis(ethylene)-2,4-dichlorodichlorodiplatinum (II) caused equilibration of the siloxane and effectiveness as catalysts for the addition could not be determined.

The addition of trifluoroethanol to vinyltriethylsilane was retarded by benzene-sulfonic acid and cupric acetate when compared to the uncatalyzed reaction. Potassium t-butoxide was an effective catalyst.

CONCENTRATIONS

Time for disappearance of t-butyl hypochlorite during the reaction of trifluoroethanol and 3-vinylheptamethyltrisiloxane varied depending on the concentration of trifluoroethanol. With a 500 percent excess, reaction time was less than 30 minutes. For a 100 percent excess, reaction time was 16 hours and for an equimolar mixture, reaction time was greater than two months.

The ratio of product to by-products showed only a slight change when the excess of t-butyl hypochlorite was reduced from 500 percent to 0 percent, i.e., it dropped from 7.0:1 to 5.8:1. Doubling the concentration of the hypochlorite to the vinyl siloxane resulted in a small increase in reaction rate with a five-fold excess of trifluoroethanol but, upon standing, acidic by-products were detected.

The rate of reaction was not appreciably changed by increasing the concentration of vinyl siloxane to t-butyl hypochlorite to 2:1 with a 500 percent excess of trifluoroethanol over hypochlorite.

SOLVENTS

Benzene, dichloromethane and nitrobenzene were found to be suitable solvents for the addition of trifluoroethanol to 3-vinylheptamethyltrisiloxane. Without solvent the reactants were initially two phases but this did not interfere with the reaction. Acetone caused a decrease in rate of reaction.

EXAMPLE 16

Effect of Reaction Variables on the Preparation of EtOCH$_2$CHClSiMe(OSiMe$_3$)$_2$ and EtOCH$_2$CHClSiEt$_3$ Procedures similar to those in Example 15 were used to determine the effect of variables on additions of ethanol. With 3-vinylheptamethyltrisiloxane, cupric acetate was an effective catalyst.

Addition to vinyltriethylsilane was catalyzed by both cupric acetate and benzene-sulfonic acid. Potassium t-butoxide catalyzed the reaction but resulted in larger amounts of by-products.

Increasing the amount of ethanol from equimolar to a five-fold excess in the reaction with 3-vinylheptamethyltrisiloxane, resulted in an increase in rate and an increase in ratio of product to by-product from 1.6:1 to 3.2:1. Acidic by-products, which rearrange the siloxane, result from a 100 percent excess of t-butyl hypochlorite and a 500 percent excess of ethanol. Doubling the concentration of the vinyl silicon material to t-butyl hypochlorite does not appreciably affect the rate with either a 100 percent or 500 percent excess of ethanol to t-butyl hypochlorite.

Both benzene and acetone were suitable solvents for the reaction of ethanol, 3-vinylheptamethyltrisiloxane and t-butyl hypochlorite.

EXAMPLE 17

Effect of Reaction Variables on the Preparation of MeOCH$_2$CH$_2$OCH$_2$CHClSiMe(OSiMe$_3$)$_2$ Using procedures similar to those in Example 15, the effects of various conditions on the reaction of 2-methoxyethanol and 3-vinylheptamethyltrisiloxane were measured. Both cupric acetate and cobalt (II) acetate were effective catalysts for this addition. Slight catalytic activity was shown by both potassium t-butoxide and benzene-sulfonic acid.

The reaction rate is increased as the concentration of the hypochlorite is increased from equimolar to a five-fold excess and the ratio of product to by-products increases from 1.8:1 to 2.5:1. With a 100 percent excess of t-butyl hypochlorite, and a 500 percent excess of 2-methoxyethanol, acidic by-products are formed which equilibrate the siloxane.

Reactions were carried out at 60°, 0°, and −78°C. with little change in product to by-product ratio. The elevated temperature reaction showed a small increase in reaction rate and the cooler temperature additions exhibited a decrease in reaction rate.

EXAMPLE 18

Addition of MeOH, EtOH, 2-PrOH and t-BuOH to 3-Vinylheptamethyltrisiloxane

A series of alcohols were added to 3-vinylheptamethyltrisiloxane with t-butyl hypochlorite using the procedures described in Example 15. Methanol was added to the siloxane in the presence of the hypochlorite to form 3-[2-methoxy-1-chloroethyl]heptamethyltrisiloxane. Ethanol was added to the siloxane in the presence of the hypochlorite to form 3[2-ethoxy-1-chloroethyl]heptamethyltrisiloxane. 2-Propanol was added to the siloxane in the presence of the hypochlorite to form 3[2(2-propoxy)-1-chloroethyl]heptamethyltrisiloxane. t-Butanol was added to the siloxane in the presence of the hypochlorite to form 3[2(t-butoxy)-1-chloroethyl]heptamethyltrisiloxane.

Cupric acetate was a catalyst for the reaction of methanol and 2-propanol. Similar rates of addition were found for methanol, ethanol and 2-propanol but for a given molar concentration of alcohol, 2-propanol gave larger amounts of by-products than methanol and ethanol which were nearly equal. t-Butanol gave a very small amount of product and the reaction was not affected by catalysts. t-butyl hypochlorite and no added protolytic material a very small amount of 3[2(t-butoxy)-1-chloroethyl]heptamethyltrisiloxane is also formed.

EXAMPLE 19

Addition of Acetic Acid to Vinylsilicon Compounds

Using the previously described procedure (Example 15) addition of acetic acid to 3-vinylheptamethyltrisiloxane with t-butyl hypochlorite to form 3[2-acetoxy-1-chloroethyl]heptamethyltrisiloxane was catalyzed by potassium t-butoxide and was retarded by cupric acetate.

Similarly, potassium t-butoxide catalyzed the reaction of acetic acid, vinyltriethylsilane and t-butyl hypochlorite to form 2-acetoxy-1-chloroethyltriethylsilane with very little formation of by-product.

EXAMPLE 20

RTV System

A vinylmethyl-dimethylsiloxane fluid, having an average of about 9 CH$_2$ CHSiMeO units and an average of about 11 Me$_2$SiO units to the molecule, was mixed with ethylene glycol and treated with t-butyl hypochlorite. The mixture jelled within one day at ambient temperature.

Using the procedure of Example 1, the following protolytic compounds are substituted for 2,2,2-trifluoroethanol to produce the respective novel organofunctional silicon compounds listed: m-nitrophenol to produce 3-[2-(m-nitrophenoxy)-1-chloroethyl]heptamethyltrisiloxane; 2-cyanoethyl alcohol to produce 3-[2-(2-cyanoethoxy)-1-chloroethyl]heptamethyltrisiloxane; triphenylcarbinol to produce 3-[2-(triphenylmethoxy)-1-chloroethyl]heptamethyltrisiloxane; octadecane thiol to produce 3-[2-(2,2,2-octadecylthio)-1-chloroethyl]heptamethyltrisiloxane; stearamide to produce 3-[2-stearamido-1-chloroethyl]heptamethyltrisiloxane; aniline to produce 3-[2-anilino-1-chloroethyl]heptamethyltrisiloxane; stearic acid to produce 3-[2-stearoyl-1-chloroethyl]heptamethyltrisiloxane; benzoic acid to produce 3-[2-benzoyl-1-chloroethyl]heptamethyltrisiloxane; piperidine to produce 3-[2-piperidyl-1-chloroethyl]heptamethyltrisiloxane; thioacetic acid to produce 3-[2-acetylthio-1-chloroethyl]heptamethyltrisiloxane; MeO(C$_2$H$_4$O)$_{10}$H to produce MeO(C$_2$H$_4$O)$_{10}$CH$_2$CHClSiMe(OSiMe$_3$)$_2$; p-chlorophenol to produce 3-[2-(p-chlorophenoxy)-1-chloroethyl]heptamethyltrisiloxane; and m-nitrophenol to produce 3-[ 2(m-nitrophenoxy)-1-chloroethyl]heptamethyl-trisiloxane.

Using the procedure of Example 9, the following protolytic compounds are substituted for ethanol, using about one mol of vinylmethyldiethoxysilane for each active hydrogen atom of the protolytic compound, to produce the respective novel organofunctional silicon compounds listed: ethylene glycol to produce (EtO)$_2$MeSiCHClCH$_2$OCH$_2$CH$_2$OCH$_2$CHCl-SiMe(OEt)$_2$; glycerol to produce CH$_2$CHCH$_2$[OCH$_2$CHClSiMe(OEt)$_2$]$_3$; pentaerythritol to produce C[CH$_2$OCH$_2$CHClSiMe(OEt)$_2$]$_4$; pentaerythritolethylene oxide adduct of the formula C[CH$_2$O(C$_2$H$_4$O)$_{14}$H]$_4$ to produce C[CH$_2$O(C$_2$H$_4$O)$_{14}$CH$_2$CHClSiMe(OET)$_2$]$_4$ sorbitol to produce

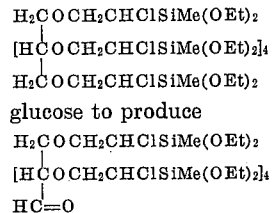

glucose to produce

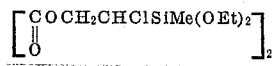

glycol-terminated ethylene glycol terephthalate polyester of the formula HOC$_2$H$_4$[OOCC$_6$H$_4$COOC$_2$H$_4$]$_{202}$MeSiCHClCH$_2$OC$_2$H$_4$[OOCC$_6$H$_4$COOC$_2$H$_4$]$_{20}$OCH$_2$CHClSiMe(OEt)$_2$; oxalic acid to produce $$\left[ \begin{array}{c} COCH_2CHClSiMe(OEt)_2 \\ \parallel \\ O \end{array} \right]_2$$

phthalic acid to produce C₆H₄[COOCH₂CHClSiMe(OEt)₂]₂; trimellitic acid to produce C₆H₃[COOCH₂CHClSiMe(OEt)₂]₃; acid-terminated ethylene glycol terephthalate polyester of the formula HO[OCC₆H₄COOC₂H₄O]₁₅OCC₆H₄COOH to produce (EtO)₂—MeSiCHCl—CH₂O[OCC₆H₄COOC₂H₄O]₁₅OCC₆H₄COOCH₂CHClSiMe(OEt)₂; ethylene diamine to produce (EtO)₂MeSiCHClCH₂NHC₂H₄NHCH₂HClSiMe(OEt)₂; succinamide to produce (EtO)₂MeSiCHClCH₂NHCOC₂H₄CONHCH₂CHCl-SiMe(OEt)₂; urea to produce CO[NHCH₂CHCl-SiMe(OEt)₂]₂; and 1,2-ethanedithiol to produce (EtO)₂MeSiCHClCH₂SC₂H₄SCH₂CHClSiMe(OEt)₂.

What is claimed is:

1. Process of producing organofunctional silicon compounds from the class consisting of silanes of the formula:

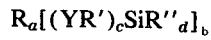

and siloxane polymers and copolymers containing the unit of the formula:

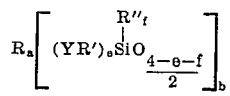

wherein *a* is an integer of 1 to 3; *b* is an integer of 1 to 6; *c* is an integer of 1 to 4; *d* is an integer of 0 to 3; the sum of *c*+*d* being no greater than 4; *e* is an integer of 1 to 3; *f* is an integer of 0 to 2; the sum of *e*+*f* being no greater than 3; R is a radical free of aliphatic unsaturation having a valence of 1 to 6, said valence being equal in the case of said silanes to *b* times *c* divided by *a* and in the case of said siloxane polymers and copolymers to *b* times *e* divided by *a*, R being selected from the class consisting of hydrogen, monovalent hydrocarbon groups having one to 18 carbon atoms per group, substituted monovalent hydrocarbon groups having one to 18 carbon atoms per group substituted with substituents from the class consisting of halogen having an atomic weight of at least 19, alkoxy, cyano, nitro and hydroxy groups; substituted monovalent hydrocarbon groups substituted with a substituent having the formula R³O(C$_n$H$_{2n}$O)$_x$— wherein R³ is a monovalent hydrocarbon group having one to 18 carbon atoms, *n* is an integer of 2 to 4, and *x* is an integer of 1 to 100, and having one to 18 carbon atoms per group in addition to those in said substituent; acyl groups having one to 18 carbon atoms per group; substituted acyl groups substituted with a substituent from the class consisting of hydroxy, alkoxy groups having one to 18 carbon atoms per alkoxy group, and R³O(C$_n$H$_{2n}$O)$_x$— groups and having one to 18 carbon atoms per group in addition to those of said substituent; divalent hydrocarbon groups having two to 18 carbon atoms; divalent groups of the formula—(C$_n$H$_{2n}$O)$_x$C$_n$H$_{2n}$—; divalent groups of the formula

wherein R⁴ is a divalent hydrocarbon group having two to 18 carbon atoms per group; divalent groups of the formula

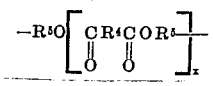

wherein R⁵ is a divalent hydrocarbon group having two to 18 carbon atoms per group; divalent groups of the formula

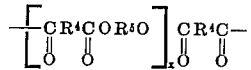

divalent groups of the formula

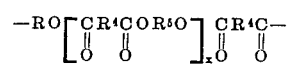

trivalent hydrocarbon groups having three to 18 carbon atoms per group; trivalent groups of the formula

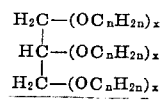

trivalent groups of the formula

wherein R⁶ is a trivalent hydrocarbon group having three to 18 carbon atoms per group; tetravalent hydrocarbon groups having three to 18 carbon atoms per group; tetravalent groups of the formula

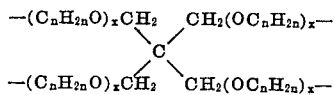

pentavalent hydrocarbon groups having four to 18 carbon atoms per group; pentavalent groups of the formula

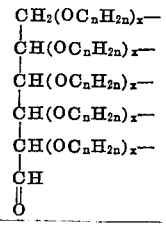

hexavalent hydrocarbon groups having four to 18 carbon atoms per group; and hexavalent groups of the formula

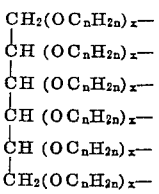

Y is a divalent element selected from the group consisting of —O—,

wherein R''' is selected from the group consisting of hydrogen and monovalent hydrocarbon having one to 18 carbon atoms, and —S—; R' is a divalent halogen-substituted hydrocarbon group having two to 18 carbon atoms selected from the class consisting of alkylene, cycloalkylene and alkylenearylene groups, wherein said halogen substituent has an atomic weight of at least 19 and it and said divalent element are bonded to adjacent non-aromatic carbon atoms; R'' is a monovalent organic group bonded to silicon and is selected from the class consisting of hydrocarbon groups, alkoxy groups, aryloxy groups, substituted hydrocarbon groups substituted with a substituent from the class consisting of halogen having an atomic weight of at least 19, alkoxy, acyl, acyloxy, cyano, nitro and hydroxy substituents, all of said groups having a total of one to 18 carbon atoms per group; $R^3(C_nH_{2n}O)_xC_nH_{2n}$- groups wherein $R^3$, $n$ and $x$ are as defined above; and substituted hydrocarbon groups substituted with an $R^3O(C_nH_{2n}O)_x$— substituent and having one to 18 carbon atoms in addition to the carbon atoms in said substituent; which comprises reacting at a temperature in the range of about $-100°$ C. to about $200°$C. and below the decomposition temperature of the reactants hereinafter set forth, an olefinically unsaturated silicon compound from the class consisting of olefinically unsaturated silanes of the formula:

wherein R'', $c$ and $d$ are as defined above and R° is an olefinically unsaturated monovalent group from the class consisting of alkenyl, cycloalkenyl and alkenylaryl groups; and olefinically unsaturated siloxanes containing at least one unit of the formula:

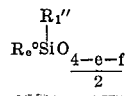

wherein R°, R'', $e$ and $f$ are as defined above; an active hydrogen atom containing compound of the formula:

in the case of reaction with said olefinically unsaturated silane, and of the formula:

in the case of reaction with said olefinically unsaturated siloxane, wherein R, Y, $a$, $b$, $c$ and $e$ are as defined above; and a positive halogen compound having a positive halogen atom of an atomic weight of at least 19.

2. Process as claimed in claim 1 wherein the amounts of said olefinically unsaturated silicon compound and said positive halogen compound are adequate to provide not more than about one positive halogen atom per olefinically unsaturated group of said silicon.

3. Process as claimed in claim 1 wherein the amounts of the olefinically unsaturated silicon compound and said active hydrogen atom containing compound are adequate to provide at least one atom of active hydrogen per olefinically unsaturated group of said silicon.

4. Process as claimed in claim 1 wherein said active hydrogen atom containing compound is acidic and the reaction is carried out in the presence of a basic catalyst.

5. Process as claimed in claim 1 wherein said active hydrogen atom containing compound is essentially neutral and the reaction is carried out in the presence of an acidic catalyst.

6. Organofunctional silicon compounds selected from the class consisting of silanes of the formula:

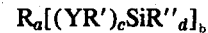

and siloxane polymers and copolymers containing the unit of the formula:

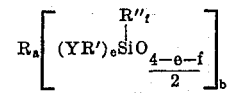

wherein $a$ is an integer of 1 to 3; $b$ is an integer of 1 to 6; $c$ is an integer of 1 to 4; $d$ is an integer of 0 to 3; $e$ is an integer of 1 to 3; $f$ is an integer of 0 to 2; R is a radical free of aliphatic unsaturation having a valence of 1 to 6, said valence being equal in the case of said silanes to $b$ times $c$ divided by $a$ and in the case of said siloxane polymers and copolymers to $b$ times $e$ divided by $a$, R being selected from the class consisting of, monovalent hydrocarbon groups having one to 18 carbon atoms per group, substituted monovalent hydrocarbon groups having one to 18 carbon atoms per group substituted with substituents from the class consisting of halogen, alkoxy, cyano, nitro and hydroxy groups; substituted monovalent hydrocarbon groups substituted with a substituent having the formula $R^3O(C_nH_{2n}O)_x$— wherein $R^3$ is a monovalent hydrocarbon group having one to 18 carbon atoms, $n$ is an integer of 2 to 4, and $x$ is an integer of 1 to 100, and having one to 18 carbon atoms per group in addition to those in said substituent; acyl groups having one to 18 carbon atoms per group; substituted acyl groups substituted with a substituent from the class consisting of hydroxy, alkoxy groups having one to 18 carbon atoms per alkoxy group, and $R^3O(C_nH_{2n}O)_x$— groups and having one to 18 carbon atoms per group in addition to those of said substituent; divalent hydrocarbon groups having two to 18 carbon atoms; divalent groups of the formula $$+C_nH_{2n}O)_xC_nH_{2n}-$$

divalent groups of the formula

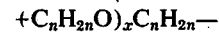

wherein $R^4$ is a divalent hydrocarbon groups having two to 18 carbon atoms per group; divalent groups of the formula

wherein $R^5$ is a divalent hydrocarbon having two to 18 carbon atoms per group; divalent groups of the formula

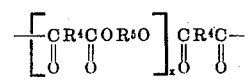

divalent groups of the formula

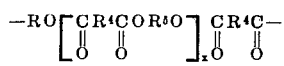

trivalent hydrocarbon groups having three to 18 carbon atoms per group; trivalent groups of the formula

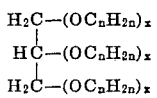

trivalent groups of the formula

wherein $R^6$ is a trivalent hydrocarbon group having three to 18 carbon atoms per group; tetravalent hydrocarbon groups having three to 18 carbon atoms per group; tetravalent groups of the formula

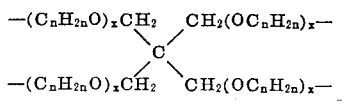

pentavalent hydrocarbon groups having four to 18 carbon atoms per group; pentavalent groups of the formula:

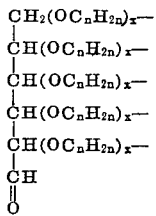

hexavalent hydrocarbon groups having four to 18 carbon atoms per group; and hexavalent groups of the formula

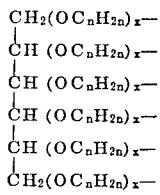

Y is a divalent element selected from the group consisting of —O—,

wherein $R'''$ is selected from the group consisting of hydrogen and monovalent hydrocarbon having one to 18 carbon atoms, and —S—; $R'$ is a divalent halogen-substituted hydrocarbon group having two to 18 carbon atoms selected from the class consisting of alkylene, cycloalkylene and alkylenearylene groups, wherein said halogen substituent has an atomic weight of at least 19 and it and said divalent element are bonded to adjacent non-aromatic carbon atoms; $R''$ is a monovalent organic group bonded to silicon and is selected from the class consisting of hydrocarbon groups, alkoxy groups, aryloxy groups, substituted hydrocarbon groups substituted with a substituent from the class consisting of halogen having an atomic weight of at least 19, alkoxy, acyl, acyloxy, cyano, nitro and hydroxy substituents, all of said groups having a total of one to 18 carbon atoms per group; $R^3(C_nH_{2n}O)_xC_nH_{2n}$- groups wherein $R^3$, $n$ and $x$ are as defined above; and substituted hydrocarbon groups substituted with an $R^3O(C_nH_{2n}O)_x$— substituent and having one to 18 carbon atoms in addition to the carbon atoms in said substituent.

7. Organofunctional silicon compound as claimed in claim 6 wherein said compound is 3-[2-(2,2,2-trifluoroethoxy)-1-chloroethyl]heptamethyltrisiloxane.

8. Organofunctional silicon compound as claimed in claim 6 wherein said compound is 2-(2,2,2-trifluoroethoxy)-1-chloroethyltrimethylsilane.

9. Organofunctional silicon compound as claimed in claim 6 wherein said compound is 3-[(2,2,2-trifluoroethoxy)chlorocyclohexyl]heptamethyltrisiloxane.

10. Organofunctional silicon compound as claimed in claim 6 wherein said compound is 2-(2,2,2-trifluoroethoxy)-1-chloroethylmethylsiloxane cyclic trimers and tetramers.

11. Organofunctional silicon compound as claimed in claim 6 wherein said compound is 3-[2-(1H,1H-perfluorooctyloxy)-1-chloroethyl]heptamethyltrisiloxane.

12. Organofunctional silicon compound as claimed in claim 6 wherein said compound is 2-ethoxy-1-chloroethylmethyldiethoxysilane.

13. Organofunctional silicon compound as claimed in claim 6 wherein said compound is 3(2-ethoxy-1-chloroethyl)heptamethyltrisiloxane.

14. Organofunctional silicon compound as claimed in claim 6 wherein said compound is 2-ethoxy-1-bromoethyltriethoxysilane.

15. Organofunctional silicon compound as claimed in claim 6 wherein said compound is 2-(2-hydroxyethoxy)-1-chloroethyltrimethylsilane.

16. Organofunctional silicon compound as claimed in claim 6 wherein said compound is $Me_3SiO(C_6H_2Br_3OCH_2HClSiMeO)_{10}SiMe_3$.

17. Organofunctional silicon compound as claimed in claim 6 wherein said compound is 2-acetoxy-1-chloroethylmethyldiethoxysilane.

18. Organofunctional silicon compound as claimed in claim 6 wherein said compound is 2-(2,2,2-trifluoroethoxy)-1-chloroethyltriethylsilane.

19. Organofunctional silicon compound as claimed in claim 6 wherein said compound is 2-ethoxy-1-chloroethyltriethylsilane.

20. Organofunctional silicon compound as claimed in claim 6 wherein said compound is 3-[2-(methoxyethoxy)-1-chloroethyl]heptamethyltrisiloxane.

21. Organofunctional silicon compound as claimed in claim 6 wherein said compound is 3-[2-methoxy-1-chloroethyl]heptamethyltrisiloxane.

22. Organofunctional silicon compound as claimed in claim 6 wherein said compound is 3-[2-(2-propoxy)-1-chloroethyl]heptamethyltrisiloxane.

23. Organofunctional silicon compound as claimed in claim 6 wherein said compound is 3-[2-butoxy-1-chloroethyl]heptamethyltrisiloxane.

24. Organofunctional silicon compound as -[in claim 6 wherein said compound is 3[2-acetoxy-1-chloroethyl]heptamethyltrisiloxane.

25. Organofunctional silicon compound as claimed in claim 6 wherein said compound is 2-acetoxy-1-chloroethyltriethylsilane.

26. Organofunctional silicon compound as claimed in claim 6 wherein said compound is the gelled reaction product of a siloxane fluid comprised of vinylmethyl siloxy units and dimethyl siloxy units with ethylene glycol and t-butyl hypochlorite.

* * * * *

UNITED STATES PATENT OFFICE
CERTIFICATE OF CORRECTION

Patent No. 3,694,480       Dated Sept. 26, 1972

Inventor(s) G.M. Omietanski

It is certified that error appears in the above-identified patent and that said Letters Patent are hereby corrected as shown below:

Claim 1, line 40 of column 21, that part of the formula shown as "$R_1$" should read --- $R_f$" ---.

Signed and sealed this 20th day of February 1973.

(SEAL)
Attest:

EDWARD M. FLETCHER, JR.                ROBERT GOTTSCHALK
Attesting Officer                      Commissioner of Patents